(12) United States Patent
Takahashi

(10) Patent No.: US 8,256,803 B2
(45) Date of Patent: Sep. 4, 2012

(54) SOCKET FOR PIPE JOINT AND PIPE JOINT

(75) Inventor: Masaki Takahashi, Yokohama (JP)

(73) Assignee: Nitto Kohki Co., Ltd., Tokyo (JP)

( * ) Notice: Subject to any disclaimer, the term of this patent is extended or adjusted under 35 U.S.C. 154(b) by 63 days.

(21) Appl. No.: 12/870,302

(22) Filed: Aug. 27, 2010

(65) Prior Publication Data
US 2010/0320747 A1 Dec. 23, 2010

Related U.S. Application Data

(63) Continuation of application No. PCT/JP2009/053710, filed on Feb. 27, 2009.

(30) Foreign Application Priority Data

Feb. 28, 2008 (JP) .................................. 2008-047572

(51) Int. Cl.
 *F16L 37/00* (2006.01)
(52) U.S. Cl. ............................ 285/316; 285/276; 285/86
(58) Field of Classification Search .................. 285/276, 285/277, 316, 315, 85, 86
See application file for complete search history.

(56) References Cited

U.S. PATENT DOCUMENTS

| | | | | |
|---|---|---|---|---|
| 2,473,973 A | * | 6/1949 | Scheiwer | 285/277 |
| 2,548,528 A | * | 4/1951 | Hansen | 285/316 |
| 3,112,767 A | * | 12/1963 | Cator | 285/277 |
| 3,613,726 A | | 10/1971 | Torres | |
| 3,674,051 A | | 7/1972 | Stratman | |
| 4,098,292 A | | 7/1978 | Evans | |
| 4,150,691 A | | 4/1979 | Maldavs | |
| 4,269,389 A | | 5/1981 | Ekman | |
| 4,388,947 A | | 6/1983 | Steuerwald | |
| 4,546,956 A | | 10/1985 | Mober | |
| 4,742,850 A | | 5/1988 | Ekman | |
| 4,745,948 A | | 5/1988 | Wilcox et al. | |

(Continued)

FOREIGN PATENT DOCUMENTS

JP 63-160492 U 10/1988

(Continued)

OTHER PUBLICATIONS

International Search Report for International Application No. PCT/JP2009/053710, dated Mar. 31, 2009, 2 pages.

*Primary Examiner* — David E Bochna
(74) *Attorney, Agent, or Firm* — Brinks Hofer Gilson & Lione

(57) ABSTRACT

A socket that receives and locks a plug has a cylindrical socket body, a plug-locking element provided in a first through-hole of the socket, a sleeve-operating element provided in a second through-hole of the socket, a sleeve, and a collar. The collar is movable between a first position (FIG. 1) and a second position where the collar allows radially inward displacement of the sleeve-operating element by the plug inserted into the socket. When the plug is inserted into the socket, first, a locking element-pushing portion of the plug pushes out the plug-locking element into a first recess of the sleeve and causes the plug-locking element to displace the sleeve rearward. As the plug is further inserted into the socket in this state, the plug engages and pushes the collar from the first position to the second position.

8 Claims, 5 Drawing Sheets

U.S. PATENT DOCUMENTS

| | | | |
|---|---|---|---|
| 4,865,292 A | 9/1989 | Ekman | |
| 4,924,909 A | 5/1990 | Wilcox | |
| 5,072,755 A | 12/1991 | Wilcox | |
| 5,211,197 A | 5/1993 | Marrison et al. | |
| 5,290,009 A * | 3/1994 | Heilmann | 285/316 |
| 5,323,812 A * | 6/1994 | Wayne | 285/316 |
| 5,390,963 A * | 2/1995 | Namekawa | 285/316 |
| 5,445,358 A | 8/1995 | Anderson | |
| 5,806,564 A | 9/1998 | Wilcox | |
| 5,873,386 A | 2/1999 | Arosio | |
| 6,131,961 A * | 10/2000 | Heilmann | 285/316 |
| 6,412,828 B1 | 7/2002 | Lacroix et al. | |
| 6,511,100 B1 | 1/2003 | Le Clinche | |
| 6,557,824 B1 | 5/2003 | Jenski et al. | |
| 6,561,551 B2 | 5/2003 | Kawakami et al. | |
| 6,568,717 B1 | 5/2003 | Le Clinche | |
| 6,779,777 B2 | 8/2004 | Kouda | |
| 6,830,059 B1 | 12/2004 | Zeiber et al. | |
| 6,830,070 B2 | 12/2004 | Mikiya et al. | |
| 6,926,031 B2 | 8/2005 | Zeiber et al. | |
| 7,225,833 B2 | 6/2007 | Marrison et al. | |
| 7,575,024 B2 | 8/2009 | Zeiber et al. | |
| 7,584,764 B2 | 9/2009 | Maldavs | |
| 7,762,279 B2 | 7/2010 | Zeiber et al. | |
| 2002/0140227 A1 | 10/2002 | Kawakami et al. | |
| 2002/0148514 A1 | 10/2002 | Taneya et al. | |
| 2007/0102051 A1 | 5/2007 | Zeiber et al. | |
| 2008/0271797 A1 | 11/2008 | Zeiber et al. | |

FOREIGN PATENT DOCUMENTS

| | | |
|---|---|---|
| JP | 07-012693 U | 3/1995 |
| JP | 07-020426 U | 4/1995 |
| JP | 09-264479 A | 10/1997 |

* cited by examiner

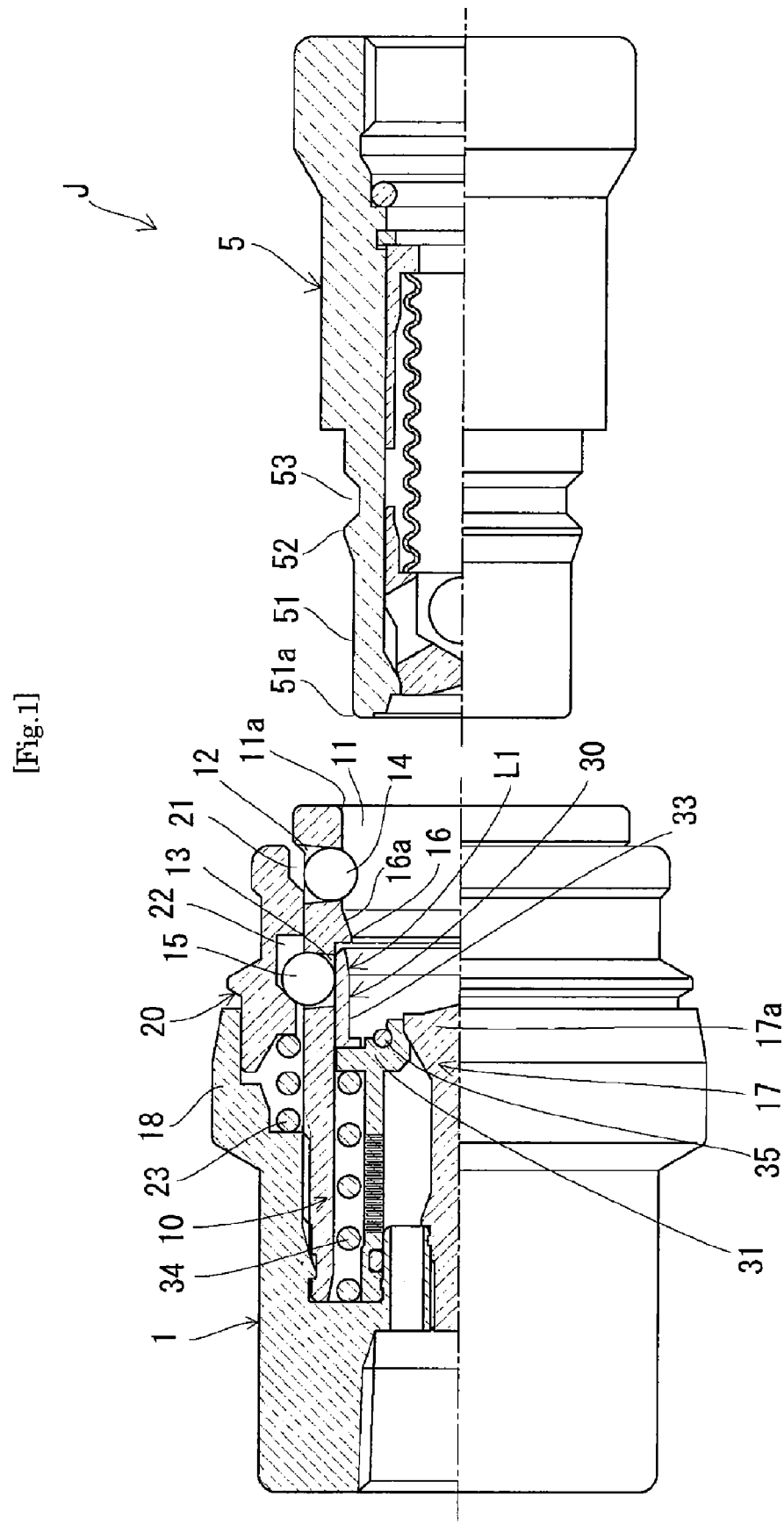
[Fig.1]

[Fig.2]
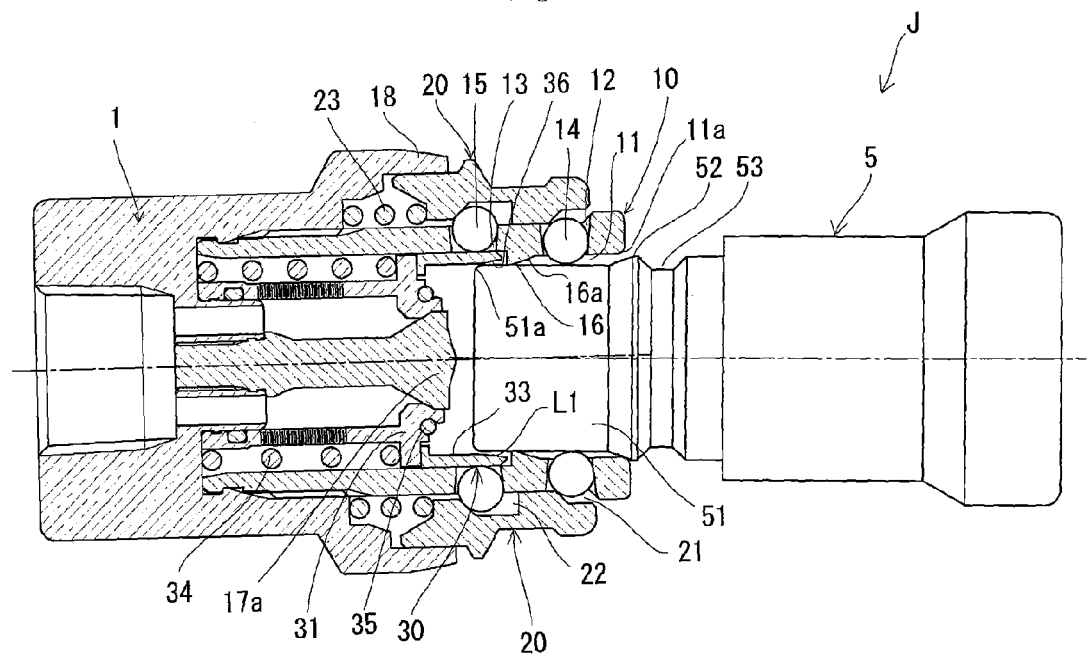
[Fig.3]
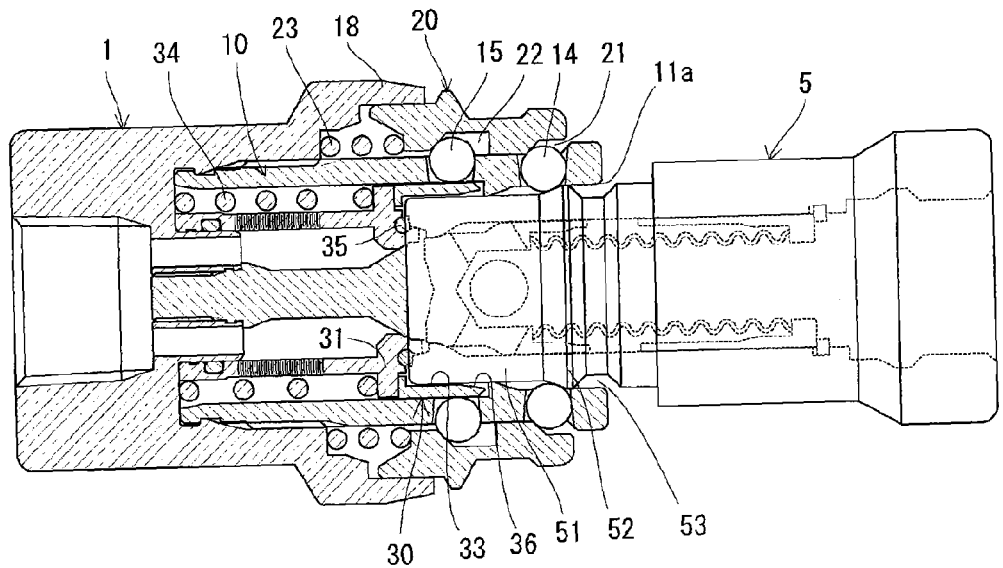

[Fig.4]
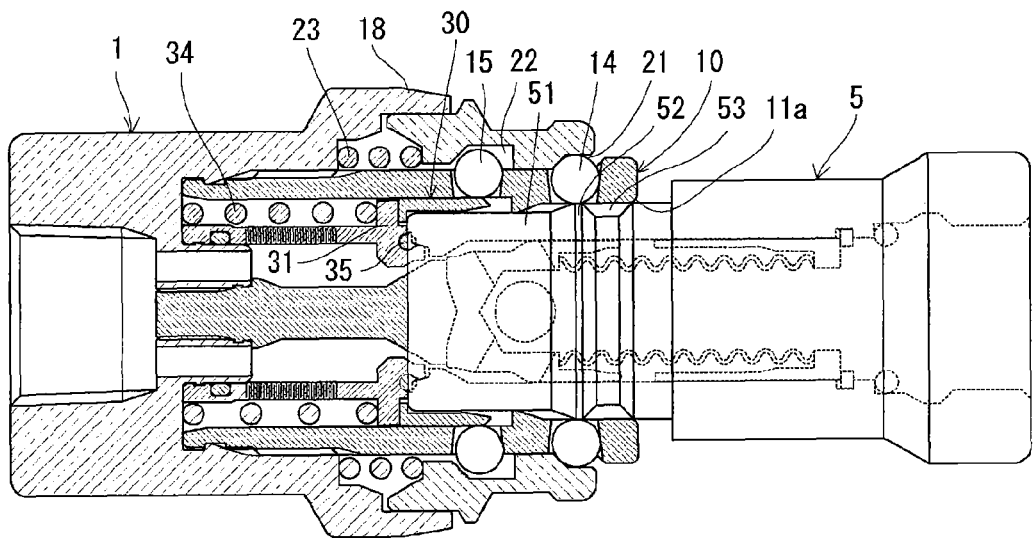
[Fig.5]
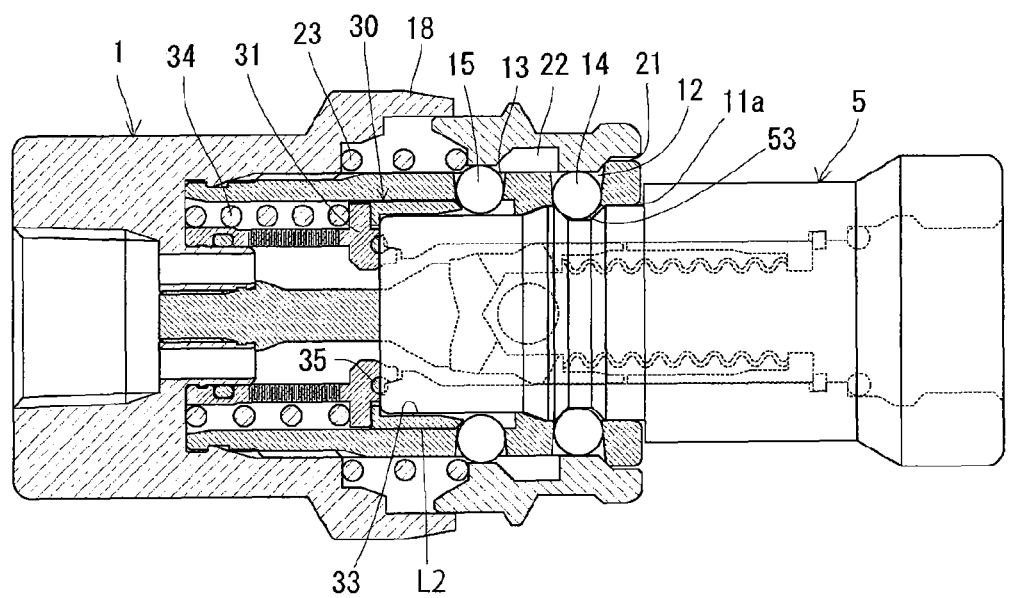

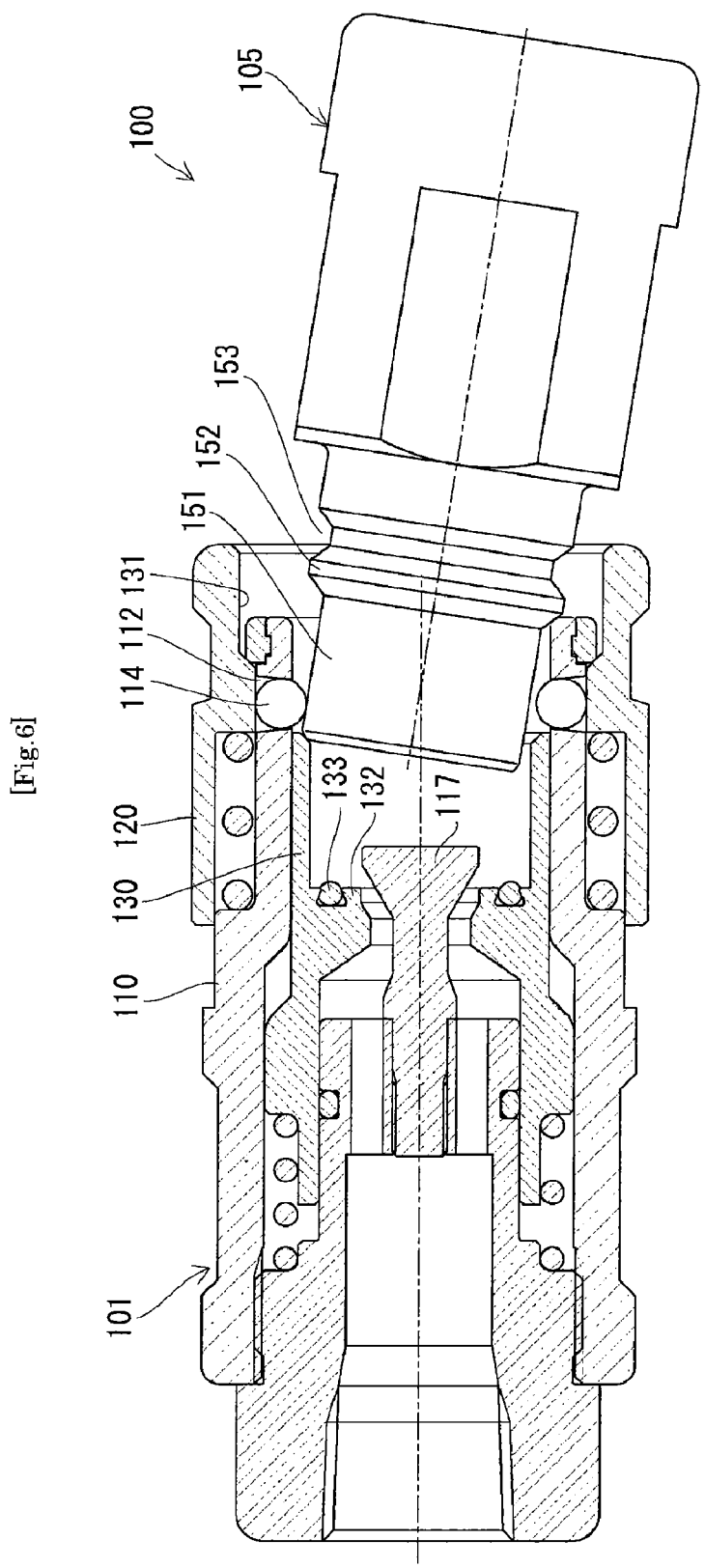
[Fig.6]

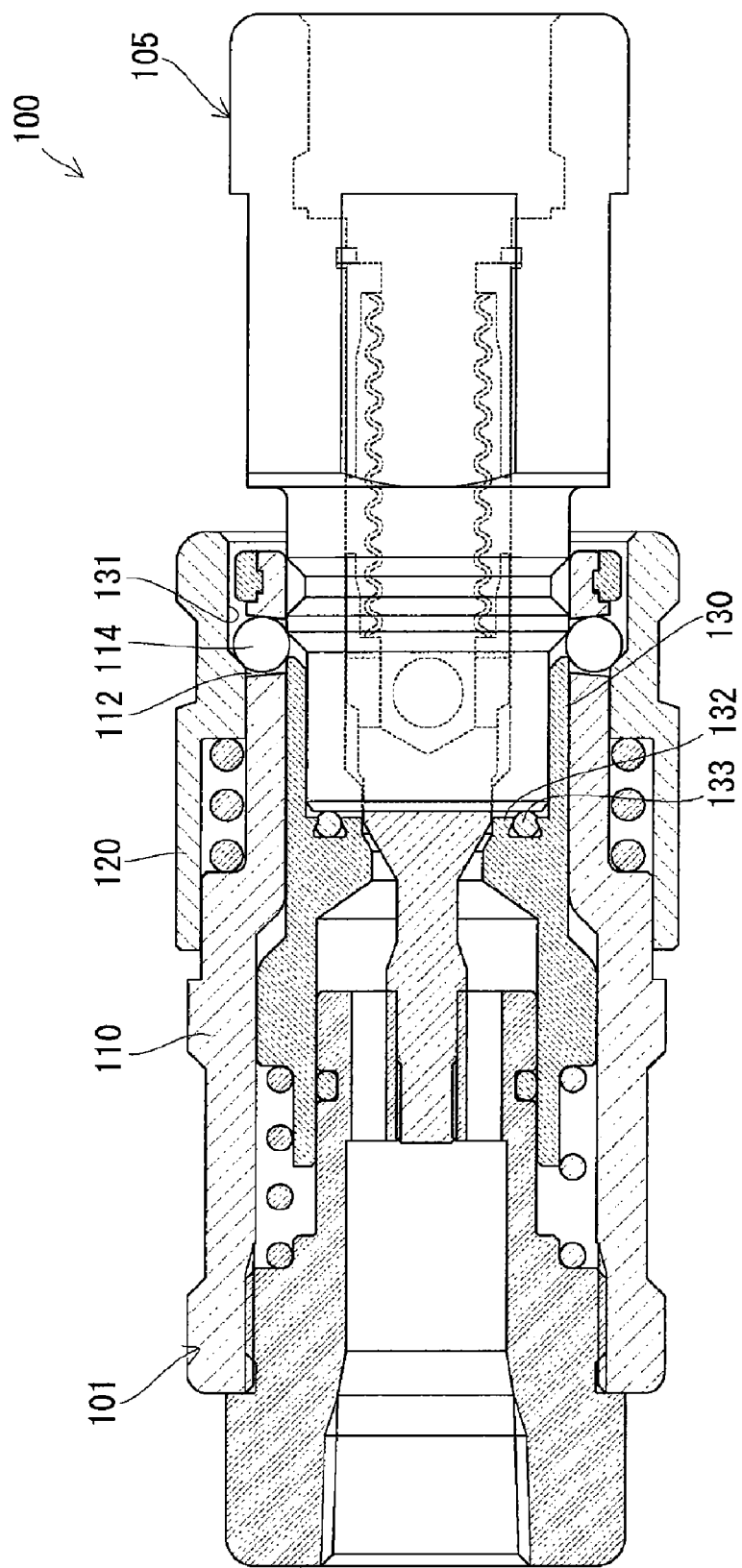
[Fig.7]

SOCKET FOR PIPE JOINT AND PIPE JOINT

RELATED APPLICATIONS

This application is a continuation of PCT/JP2009/053710 filed on Feb. 27, 2009, which claims priority to Japanese Application No. 2008-047572 filed on Feb. 28, 2008. The entire contents of these applications are incorporated herein by reference.

TECHNICAL FIELD

The present invention relates to a socket of a pipe joint used by inserting a plug into the socket and also relates to such a pipe joint. More particularly, the present invention relates to what is called a one-touch connection type pipe joint comprising a socket and a plug that can be connected to each other simply by inserting the plug into the socket. The present invention also relates to a socket for use in such a pipe joint.

BACKGROUND ART

With a one-touch connection pipe joint, simply inserting a plug (male joint member) into a socket (female joint member) causes a spherical locking element of the socket to engage with a locking recess formed on the outer surface of the plug inserted, thereby locking the pipe joint to prevent the plug from being pulled out of the socket. There have heretofore been developed some different types of one-touch connection pipe joints.

FIGS. 6 and 7 show a pipe joint 100 of one of the above-mentioned types. The pipe joint comprises a socket 101 and a plug 105 that is inserted into the socket. The socket 101 has a cylindrical socket body 110, a collar 130 installed in the socket body 110 slidably in the longitudinal direction of the socket body, and a sleeve 120 provided around the outer periphery of the socket body 110 displaceably in the longitudinal direction and urged forward of the socket body 110. When the plug is not inserted in the socket, the collar 130 is spring-urged to a forward position, and a locking element 114 is pushed radially outward by the collar and received in a forward recess 131 of the sleeve to hold the sleeve in a rear position against spring urging. When the plug is inserted into the socket, the plug is inserted into the collar, and the forward end surface of the plug presses and deforms an O-ring 133 provided on the forward end surface of a movable valve member 132 integrally formed with the collar 130. At the same time, an annular locking element-pushing portion 152 provided on the outer peripheral surface of the plug substantially engages with the forward end surface of the collar 130. While doing so, the plug pushes the collar rearward. When a locking recess 153 provided on the outer peripheral surface of the plug radially aligns with the locking element 114, the locking element enters the locking recess 153. Consequently, the sleeve 120 is displaced forward to hold the locking element in the state of being pressed in the locking recess, thereby locking the plug.

The above-described conventional pipe joint has the following problems.

That is, if the plug 105 is inserted obliquely as shown in FIG. 6, the forward end of the plug 105 may come in contact with the forward end of the collar 130, causing a part of the collar 130 to be pushed undesirably. This may cause the movable valve member 132, which is integrally formed with the collar 130, to be displaced from the position of sealing engagement with a fixed valve member 117 provided at a position along the axis of the socket body, resulting in cancellation of the sealing of the socket, and causing leakage.

In addition, if the plug 105 inserted into the socket is suddenly pulled out for some reason after the collar has been pushed in to a position where the forward end of the collar disengages from the locking element, the locking element 114 may be slightly displaced radially inward by the sleeve 120 before the collar is returned forward by the spring force, resulting in only the plug being pulled out of the socket, with the collar being left unable to return. In this state, the movable valve member also has not yet returned to the position of sealing engagement with the fixed valve member. Therefore, there will be fluid leakage from the socket.

Patent Literature 1 noted below proposes a pipe joint for high-pressure fluid that has two locking elements for locking the plug, in which one of the locking elements is configured to function as a sleeve-operating element.

Patent Literature 1: JP-012693Y

However, the pipe joint according to the above-mentioned proposition has not yet solved either of the above-described problems because its purpose is not to solve the foregoing problems.

SUMMARY OF THE INVENTION

An object of the present invention is to solve the above-described problems of the conventional pipe joints and to provide a socket free from leakage either when the plug is connected to or disconnected from the socket, and also provide a pipe joint having the socket of the present invention.

The present invention provides a socket (1) that receives and locks a plug (5) having an insert part (denoted by reference numeral 51 in the following embodiment; the same shall apply hereinafter) with a predetermined diameter extending rearward from the forward end of the plug, a locking element-pushing portion (52) provided contiguously with the insert part (51) and having a larger diameter than that of the insert part (51), and a locking recess (53) provided contiguously with the locking element-pushing portion (52). The socket (1) includes a cylindrical socket body (10) having a plug-receiving part (11) that is open forward to receive the plug (5) from the forward end of the plug and that has a larger inner diameter than the diameter of the locking element-pushing portion (52), a first through-hole (12) extending through the socket body in a radial direction of the socket body, and a second through-hole (13) extending through the socket body in the radial direction at a position rearward of the first through-hole (12). The socket (1) further includes a plug-locking element (14) radially movable in the first through-hole (12) between a locking position where the plug-locking element (14) engages with the locking recess (53) of the plug (5) inserted into the plug-receiving part (11) to prevent the plug (5) from being pulled out of the plug-receiving part (11) and an unlocking position where the plug-locking element (14) disengages from the locking recess (53) of the plug (5) to allow the plug (5) to be pulled out of the plug-receiving part (11), a sleeve-operating element (15) radially movable in the second through-hole (12), and a sleeve (20) provided around the socket body (10) displaceably in the longitudinal direction of the socket body (10) and urged forward. The sleeve (20) has a first recess (21) allowing the plug-locking element to assume the unlocking position and a second recess (22) allowing the sleeve-operating element (15) to be pushed radially outward. Further, the socket (1) includes a collar (30) provided in the socket body (10) slidably in the longitudinal direction of the socket body (10) and urged forward. The collar (30) has a plug forward end-receiving part (33) that is open forward to receive the insert part of the plug (5). When the plug (5) is not inserted in the socket (1), the collar (30) is placed in a first position where the collar (30) pushes the sleeve-operating element (15) radially outward into the second recess (22) of the sleeve (20) to make the sleeve-operating element (15) engage with the sleeve (20) to prevent the sleeve (20) from being displaced forward so that the first recess (21) of the sleeve (20) radially aligns with the plug-locking element (14) to allow the plug-locking element (14) to be displaced between the locking position and the unlocking position. When the plug (5) is inserted and connected to the socket (1), the collar (30) is placed in a second position where the collar (30) is pushed in rearward by the insert part (51) of the plug (5) received in the collar (30) such that the outer peripheral surface of the insert part (51) of the plug (5) comes substantially in contact with the inner peripheral surface of the plug forward end-receiving part (33) of the collar (30), thereby allowing the sleeve-operating element (15) to be displaced radially inward, and thus causing the sleeve (20) to be displaced forward to press the plug-locking element (14) into the locking position. When the plug (5) is inserted into the socket (1) toward the position of connection with the socket (1), the locking element-pushing portion (52) of the plug (5) pushes out the plug-locking element (14) into the first recess (21) to make the plug-locking element engage and displace the sleeve (20) rearward. As the plug is further inserted into the socket in this state, the plug engages and displaces the collar from the first position to the second position.

In the socket according to the present invention, the displacement of the collar takes place after the locking element-pushing portion has pushed out the plug-locking element to displace the sleeve rearward, thereby releasing the sleeve-operating element from the press engagement with the sleeve. That is, in a case where the movable valve member is contiguously connected to the collar as in the pipe joint according to the above-described prior art, for example, the displacement of the movable valve member takes place after the sleeve-operating element has been released from the press engagement with the sleeve. If the plug is suddenly pulled out in such a state, the sleeve-operating element offers substantially no resistance to the displacement of the collar because the sleeve-operating element is not in press engagement with the sleeve. Accordingly, the collar can be rapidly returned to the first position (position assumed by the collar before it is displaced) by the forward urging force applied thereto. Therefore, it is possible to prevent the problem of fluid leakage even in a case where the movable valve member is contiguously connected to the collar as stated above.

In the socket of the present invention, the socket body (10) may have a guide portion (16) located forward of the collar (30) and adjacent to the forward end edge of the collar (30) as placed in the first position to prevent the forward end of the plug (5) as inserted into the socket (1) from engaging with the forward end surface of the collar (30) and to guide the forward end of the plug (5) into the collar (30).

In the socket of the present invention, the guide portion (16) may be an annular projection projecting from the inner peripheral surface of the socket body (10) and having a smaller inner diameter than that of the collar (30). This is for preventing the forward end edge of the plug from engaging with the collar even more reliably.

Further, the socket of the present invention may further include a fixed valve member (17) fixed at its rear end to the socket body (10) to extend forward along the axial direction of the socket body (10) and having a valve head at its forward end, and an annular movable valve member (31) longitudinally slidable along the inner peripheral surface of the socket body (10) and urged forward to sealingly engage with the valve head (17a). In this case, the collar (30) extends forward from the forward end surface of the movable valve member (31). With this structure, when the collar is moved rearward, the movable valve member (31) is moved rearward to separate from the valve head of the fixed valve member (17), thus canceling the sealing engagement. By virtue of this structure, even if the plug is suddenly pulled out after the collar has been moved rearward, the collar can immediately return to the original first position, and hence the movable valve member can also return into sealing engagement with the valve head of the fixed valve member to prevent leakage of fluid.

In this case, the arrangement may be as follows. The collar (30) is of a cylindrical shape, and the socket has a seal ring (35) that seals between the forward end surface of the plug (5) received in the plug forward end-receiving part (33) of the collar when the plug (5) is inserted and the forward end surface of the movable valve member (31). This structure is for ensuring the sealing engagement between the plug and the movable valve member when the plug received in the collar moves the collar and hence moves the movable valve member.

In addition, the present invention provides a pipe joint including the socket (1) of the present invention and the plug (5) that is inserted and connected to the socket (1). In the pipe joint, the collar (30) is pushed in to the second position by the plug (5) inserted in the collar (30) after the plug-locking element (14) has reached the position for preventing forward displacement of the sleeve (20). This pipe joint eliminates leakage when connecting and disconnecting the plug.

Embodiments of the present invention will be explained below with reference to the accompanying drawings.

BRIEF DESCRIPTION OF THE DRAWINGS

FIG. 1 is a side view of a first embodiment of the pipe joint according to the present invention, showing an axial half thereof in a sectional view.

FIG. 2 is a side view of the pipe joint shown in FIG. 1, showing the process of inserting the plug into the socket, in which the socket is shown in an axially sectional view.

FIG. 3 is a side view of the pipe joint shown in FIG. 1, showing the process of inserting the plug into the socket, in which the socket is shown in an axially sectional view.

FIG. 4 is a side view of the pipe joint shown in FIG. 1, showing the process of inserting the plug into the socket, in which the socket is shown in an axially sectional view.

FIG. 5 is a side view of the pipe joint shown in FIG. 1, showing a state where the plug has been completely inserted into the socket, in which the socket is shown in an axially sectional view.

FIG. 6 is a side view of a conventional pipe joint, showing the process of inserting the plug into the socket, in which the socket is shown in an axially sectional view.

FIG. 7 is a side view of the pipe joint shown in FIG. 6, showing the process of disconnecting the plug from the socket, in which the socket is shown in an axially sectional view.

DETAILED DESCRIPTION OF THE PREFERRED EMBODIMENTS

As shown in FIGS. 1 to 5, a pipe joint J according to the present invention comprises a socket 1 and a plug 5.

The plug 5 has an insert part 51 with a predetermined diameter extending rearward from the forward end of the plug 5, a locking element-pushing portion 52 provided contiguously with the insert part 51 and having a larger diameter than that of the insert part 51, and a locking recess 53 provided contiguously with the locking element-pushing portion to receive a plug-locking element 14 (described later) to lock the plug 5 to the socket 1.

The socket 1 has a cylindrical socket body 10, a sleeve 20 provided around the socket body 10 displaceably in the longitudinal direction of the socket body 10 and urged forward by a spring 23, and a collar 30 provided in the socket body 10 slidably in the longitudinal direction of the socket body 10 and urged forward by a spring 34.

The socket body 10 has a plug-receiving part 11 that is open forward to receive the plug, a first through-hole 12 provided to extend through the socket body 10 in the radial direction thereof, and a second through-hole 13 provided to extend through the socket body 10 in the radial direction at a position rearward of the first through-hole 12.

The first through-hole 12 is provided therein with a plug-locking element 14, which is a sphere. The plug-locking element 14 is radially movable in the first through-hole 12 between a locking position (see FIG. 5) where the plug-locking element 14 engages with the locking recess 53 of the plug 5 inserted into the plug-receiving part 11 to prevent the plug 5 from being pulled out of the plug-receiving part 11 and an unlocking position (see FIG. 4) where the plug-locking element 14 disengages from the locking recess 53 to allow the plug 5 to be pulled out of the plug-receiving part 11. The first through-hole 12 has an inner opening having a somewhat smaller diameter than that of the plug-locking element 14 to allow the plug-locking element 14 to project from the inner opening to such an extent that the plug-locking element 14 can lock the plug 5 and at the same time to prevent the plug-locking element 14 from falling off.

The second through-hole 13 is provided therein with a sleeve-operating element 15, which is a sphere, radially movable in the second through-hole 13.

The outer periphery of the socket body 10 is provided with a sleeve-accommodating portion 18 that covers and engages the rear end of the sleeve 20 to retain the sleeve 20.

The socket body 10 has a guide portion 16 located forward of the collar 30 and adjacent to the forward end edge of the collar 30. In this embodiment, the guide portion 16 is provided between the first through-hole 12 and the second through-hole 13.

As shown in FIG. 2, the guide portion 16 is an annular projection projecting from the inner peripheral surface of the socket body 10 and having a smaller inner diameter than that of the collar 30. The guide portion 16 has a triangular shape in a radial section containing the axis of the socket body 10 and has an acute tapered surface 16a at an end thereof closer to the forward end of the socket.

The guide portion 16 prevents the forward end of the plug 5 as inserted into the socket 1 from engaging with the forward end surface of the collar 30 and guides the forward end portion and outer peripheral surface of the insert part 51, thereby guiding the insert part 51 into the collar 30. Because the tapered surface 16a is provided, the insert part 51 of the plug can be smoothly guided into the collar 30 even if the outer peripheral edge 51a of the forward end surface of the plug 5 and the tapered surface 16a come in contact with each other.

As shown in FIG. 2, the forward end edge portion 11a of the plug-receiving part 11 is formed so as to guide the locking element-pushing portion 52 of the plug into the plug-receiving part 11 when the guide portion 16 guides the insert part 51 as stated above.

The socket 1 has a fixed valve member 17 fixed at its rear end to the socket body to extend forward along the axial direction of the socket body and having a valve head 17a at its forward end. The socket 1 further has a movable valve member 31 extending forward along the axial direction of the socket body and sealingly engaged with the valve head 17a of the fixed valve member 17.

The socket 1 is so formed that the plug 5 as inserted therein is supported by the inner peripheral surface (top) of the guide portion 16, which is an annular projection, and the inner peripheral surface of the end of the plug-receiving part 11 without any contact between the inner peripheral surface of the collar 30 and the plug 5.

The collar 30 is of a cylindrical shape having an inner peripheral surface with substantially the same diameter as that of the plug and has a plug forward end-receiving part 33 that is open forward to receive the plug as inserted into the socket. The collar 30 is secured to the forward end surface of the movable valve member 31 so as to be displaceable in the axial direction together with the movable valve member 31. The plug forward end-receiving part 33 is formed so that the outer peripheral surface of the insert part 51 is substantially in contact with the inner peripheral surface of the plug forward end-receiving part 33. It should be noted that the term "substantially in contact with" in this sentence means that the inner peripheral surface of the collar and the outer peripheral surface of the insert part of the plug come in close proximity to each other, but does not necessarily mean that the inner peripheral surface of the collar and the outer peripheral surface of the insert part of the plug come in contact with each other. In addition, a rectilinear tapered surface 36 (see FIGS. 2 and 3) is provided on the inner peripheral surface of the collar 30 to prevent the forward end of the collar 30 and the forward end of the plug from engaging each other.

The sleeve 20 has a first recess 21 formed on an end portion thereof closer to the forward end of the socket 1 to allow the plug-locking element 14 to assume the unlocking position and a second recess 22 located closer to the rear end of the socket 1 and having a size sufficient to accommodate the upper hemispherical portion of the sleeve-operating element 15. The first recess 21 has an inclined surface on the side wall thereof. The second recess 22 has an inclined surface on the rear side wall thereof.

The collar 30 is displaceable between a first position L1 shown in FIGS. 1 and 2 and a second position L2 shown in FIG. 5.

That is, as shown in FIGS. 1 and 2, the first position L1 is the position that the collar 30 assumes when the plug 5 is not inserted in the socket 1. In the first position L1, the collar 30 pushes the sleeve-operating element 15 radially outward into the second recess 22 to make the sleeve-operating element 15 engage with the sleeve 20 to prevent the sleeve 20 from being displaced forward, while allowing the plug-locking element 14 to be displaced between the locking position and the unlocking position.

The second position L2 is, as shown in FIG. 5, the position that the collar 30 assumes when the plug 5 is inserted in the socket 1. In the second position L2, the collar 30 is pushed in rearward by the plug 5 to allow the sleeve-operating element 15 to be displaced radially inward to disengage from the sleeve 20, causing the sleeve 20 to be displaced forward to press the plug-locking element 14 into the locking position, When the plug 5 is inserted into the socket 1 toward the position of connection with the socket 1, first, the locking element-pushing portion 52 of the plug 5 pushes the plug-locking element 14 into the first recess 21 to make the plug-locking element 14 engage and displace the sleeve 20 rearward, thereby releasing the press engagement between the sleeve and the sleeve-operating element (FIG. 3). In this state, the forward end surface of the plug 5 pressingly engages with a seal ring 35 on the forward end surface of the movable valve member 31. As the plug is further inserted into the socket, the collar is displaced from the position L1 to the position L2.

In the pipe joint of this embodiment, when the guide portion 16 guides the outer peripheral surface of the insert part 51 of the plug 5, the forward end edge portion 11a of the plug-receiving part 11 engages with the locking element-pushing portion 52 of the plug 5 to guide the plug into the socket.

Next, the mode of using the pipe joint of this embodiment will be explained with reference to FIGS. 2 to 5.

With the pipe joint J of this embodiment, first, as shown in FIG. 2, the insert part 51 of the plug 5 is inserted into the plug-receiving part 11 of the socket body 10. At this time, the guide portion 16 provided in the socket body 10 prevents the problem that the forward end of the plug 5 engages with the forward end of the collar 30 and moves the collar 30, causing the movable valve member 31 to separate from the fixed valve member 17 undesirably, as experienced with the conventional pipe joint.

When the plug 5 is inserted into the collar as shown in FIG. 3, the forward end surface of the plug 5 presses and deforms the seal ring 35 on the forward end surface of the movable valve member 31 and thus sealingly engages with the seal ring 35. In this state, the locking element-pushing portion 52 pushes the plug-locking element 14 radially outward to engage with the sleeve 20 and to apply a rearward force to the sleeve 20.

As shown in FIG. 4, as the plug 5 is further pushed in, the plug-locking element 14 slightly displaces the sleeve 20 rearward, causing the sleeve to come out of the press engagement with the sleeve-operating element, and in this state, the plug 5 displaces the collar and the movable valve member rearward. When the plug 5 is pushed in as far as the position shown in FIG. 5, the plug-locking element 14 radially aligns with the locking recess 53, and the sleeve-operating element disengages from the collar 30, thereby allowing the sleeve 20 to be displaced forward by the spring 23 to press the plug-locking element 14 into the locking recess 53. In this state, both the plug-locking element 14 and the sleeve-operating element 15 are engaged with the inner surface of the sleeve 20 and thus prevented from being displaced. Accordingly, the whole pipe joint is locked.

In this pipe joint, as will be understood from FIGS. 2 to 5, even if the plug inserted into the socket is suddenly pulled out after the collar and the movable valve member have started to be displaced by the plug, the sleeve-operating element is still supported by the collar, and moreover, the sleeve-operating element has already been released from the press engagement with the sleeve at this time. Therefore, the sleeve-operating element causes substantially no resistance to the displacement of the collar. Accordingly, the collar can be rapidly returned by the forward urging force applied thereto to the position L1 assumed by the collar before it is displaced.

To disconnect, as shown in FIG. 4, the sleeve 20 is pulled back toward the rear of the socket to unlock, thereby allowing the plug to be pulled out of the socket.

Although some embodiments of the present invention have been described above, the present invention is not limited to these embodiments but can be modified in a variety of ways without departing from the gist of the invention. For example, although the movable valve member and the cylindrical part of the collar have been described as being separate elements, these may be integrally formed with each other. Further, the inner peripheral surface of the collar 30 may be provided with a curvilinear tapered portion. Although in the foregoing embodiment the locking element-pushing portion 52 pushes the plug-locking element 14 radially outward to prevent the sleeve 20 from being displaced forward, the arrangement may be such that the insert part 51 of the plug pushes the plug-locking element 14 radially outward when passing along the radially inner side of the plug-locking element 14, thereby preventing the sleeve 20 from being displaced forward.

The invention claimed is:

1. A socket that receives and locks a plug, the plug having an insert part with a predetermined diameter extending rearward from a forward end of the plug, a locking element-pushing portion provided contiguously with the insert part and having a larger diameter than that of the insert part, and a locking recess provided contiguously with the locking element-pushing portion, the socket comprising:

a cylindrical socket body having a plug-receiving part that is open forward to receive the plug from the forward end of the plug and that has a larger inner diameter than the diameter of the locking element-pushing portion, a first through-hole extending through the cylindrical socket body in a radial direction of the cylindrical socket body, and a second through-hole extending through the cylindrical socket body in the radial direction at a position rearward of the first through-hole;

a plug-locking element radially movable in the first through-hole between a locking position where the plug-locking element engages with the locking recess of the plug inserted into the plug-receiving part to prevent the plug from being pulled out of the plug-receiving part and an unlocking position where the plug-locking element disengages radially outward from the locking recess of the plug to allow the plug to be pulled out of the plug-receiving part;

a sleeve-operating element radially movable in the second through-hole;

a sleeve provided around the cylindrical socket body displaceably in a longitudinal direction of the cylindrical socket body and urged forward, the sleeve having a first recess allowing the plug-locking element to assume the unlocking position and a second recess allowing the sleeve-operating element to be pushed radially outward; and a collar provided in the cylindrical socket body slideably in the longitudinal direction of the cylindrical socket body and urged forward, the collar having a plug forward end-receiving part that is open forward to receive the insert part of the plug;

wherein, when the plug is not inserted in the socket, the collar is placed in a first position where the collar pushes the sleeve-operating element radially outward into the second recess of the sleeve to make the sleeve-operating element engage with the sleeve urged forward while being pinched between the sleeve and collar to prevent the sleeve from being displaced forward so that the first recess of the sleeve radially aligns with the plug-locking element to allow the plug-locking element to be displaced between the locking position and the unlocking position, wherein, when the plug is inserted and connected to the socket, the collar is placed in a second position where the collar is pushed rearward by the insert part of the plug received in the collar such that the insert part of the plug comes substantially in contact with an inner peripheral surface of the plug forward end-receiving part of the collar, thereby allowing the sleeve-operating element to be displaced radially inward, and thus causing the sleeve to be displaced forward to press the plug-locking element into the locking position; and wherein, when the plug is inserted into the socket toward a position of connection with the socket, the locking element-pushing portion of the plug pushes the plug-locking element into the first recess to make the plug-locking element engage and displace the sleeve rearward so that the sleeve-operating element is relieved from the pinching by the sleeve and the collar, and as the plug is further inserted into the socket in this state, the plug engages and displaces the collar from the first position to the second position.

2. The socket of claim 1, wherein the cylindrical socket body has a guide portion located forward of the collar and adjacent to a forward end edge of the collar as placed in the first position to prevent the forward end of the plug as inserted into the socket from engaging with a forward end surface of the collar and to guide the forward end of the plug into the collar.

3. The socket of claim 1, wherein the guide portion is an annular projection projecting from an inner peripheral surface of the cylindrical socket body and having a smaller inner diameter than that of the collar.

4. The socket of claim 3, further comprising:
a fixed valve member having a rear end fixed to the cylindrical socket body, the fixed valve member extending forward the rear end along an axial direction of the cylindrical socket body and having a rear end with a valve head; and
an annular movable valve member longitudinally slidable along the inner peripheral surface of the cylindrical socket body and urged forward to sealingly engage with the valve head;
the collar extending forward from a forward end surface of the movable valve member.

5. The socket of claim 4, wherein the collar is of a cylindrical shape, the socket having a seal ring that seals between the forward end surface of the movable valve member and a forward end surface of the plug received in the plug forward end-receiving part of the collar when the plug is inserted.

6. The socket of claim 1, further comprising:
a fixed valve member having a rear end fixed to the cylindrical socket body, the fixed valve member extending forward from the rear end along an axial direction of the cylindrical socket body and having a forward end with a valve head; and
an annular movable valve member longitudinally slidable along the inner peripheral surface of the cylindrical socket body and urged forward to sealingly engage with the valve head;
the collar extending forward from a forward end surface of the movable valve member.

7. The socket of claim 6, wherein the collar is of a cylindrical shape, the socket having a seal ring that seals between the forward end surface of the movable valve member and a forward end surface of the plug received in the plug forward end-receiving part of the collar when the plug is inserted.

8. A pipe joint comprising:
the socket as defined in claim 1; and
a plug having an insert part with a predetermined diameter extending rearward from a forward end of the plug, a locking element-pushing portion provided contiguously with the insert part and having a larger diameter than that of the insert part, and a locking recess provided contiguously with the locking element-pushing portion.

* * * * *